Patented Dec. 20, 1949

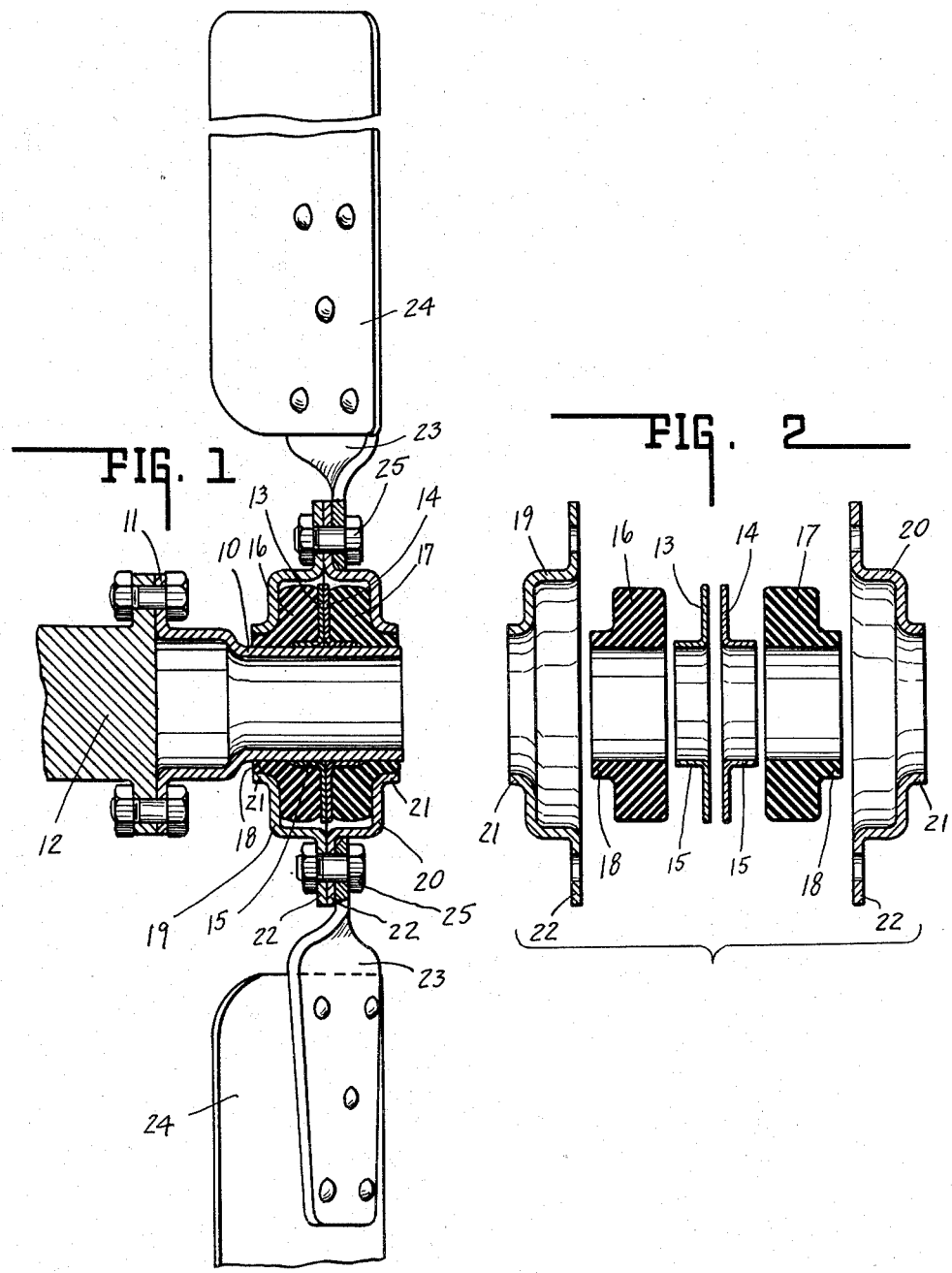

2,492,029

UNITED STATES PATENT OFFICE 2,492,029

FAN ASSEMBLY

Kurt A. Beier, Indianapolis, Ind., assignor to Schwitzer-Cummins Company, Indianapolis, Ind.

Application July 13, 1946, Serial No. 683,483

2 Claims. (Cl. 64—11)

This invention relates to a fan assembly, particularly for cooling systems of internal combustion engines and particularly wherein the fan may be directly mounted upon the crankshaft.

In fan constructions for motor cooling systems various arrangements have been proposed for providing a yielding connection between the shaft as the driving member and the fan as the driven member for yieldingly transmitting the driving torque therebetween. Certain advantages have been ascribed to such arrangements. Thus such yielding driving connection has been employed primarily for absorbing shock, also for absorbing vibrations such as to deaden noise transmission by eliminating metal to metal contact between the members. The fan has also been employed as a vibration damper, the yielding torque transmitting medium permitting relative rotation between the driven and driving members, and wherein the fan constitutes an inertia element.

It is the object of this invention to improve upon structures of this character, the purpose thereof being directed to simplified shock absorbing construction and assembly, but more particularly to a shock absorbing and vibration isolator support for the fan which will stabilize it and resist any deflection out of its proper plane of rotation. Thus the fan will be at all times rotated in a plane perpendicular to and radially of its axial center.

Another feature of the invention resides in the mounting of the fan such that in assembly it will be readily located on the driving member or shaft with a substantial bearing support longitudinally thereof and in the proper radial plane of rotation. To this end it is provided with opposed torque transmitting elements having their bearing and driving surfaces extending both radially and concentrically of the center of rotation.

The full nature of the invention will be understood from the accompanying drawings and the following description and claims:

Fig. 1 is a central vertical section through the fan assembly.

Fig. 2 shows the parts thereof in exploded preassembled relation.

In the drawings there is shown a fan hub 10 rearwardly flanged at 11 adapted to be secured to the end of a driving shaft 12. Said shaft 12 may comprise the crankshaft of an internal combustion engine or any driving shaft or supporting spindle depending upon the character of the fan and its purpose.

Secured about the hub 10 substantially centrally thereof there are a pair of radially disposed driving plates 13 and 14. Said plates are secured together such as by welding in face to face relation, having their inner peripheries flanged outwardly to jointly form a wide band or collar 15 concentric with and secured about the hub 10 so that said plates are centrally and radially located relative thereto. Said plates with the hub constitute the driving member of the assembly.

Mounted adjacent the plate 13 there is provided a relatively wide torque transmitting element 16 of yielding material such as rubber. A corresponding element 17 is opposed thereto for face to face engagement with the plate 14. Said elements are preferably in the form of rubber rings and provided with the outwardly flanged sleeves 18 extending longitudinally of and in gripping relation with the surface of the hub substantially beyond the bands 15 of said plates.

Mounted about the torque transmitting elements 16, 17 there is a pair of cupped clamping heads 19, 20, respectively, which form the hub of the driven member. The inner side walls of said heads have face to face contact with the outer radial faces of the respective rubber elements 16, 17 and are each flanged outwardly at 21 for peripheral face to face driving contact with the outer periphery of the sleeves 18. Said clamping heads are radially and outwardly flanged at 22 for carrying the radially extending fan support, herein shown as comprising the spiders 23 upon which the fan blades 24 are mounted. Said heads are clamped together with the spiders by the bolts 25 and are in such relation as to compress the rubber elements 16, 17 between them and secure the interposed driving plates 13, 14.

The above described structure is such that a shock absorbing and vibration isolator mounting for the fan is obtained through the rubber elements 16, 17, including their stabilizing outwardly flared sleeves 18. Whereas said rubber elements may be very resilient torsionally and of a density to obtain the desired shock absorbing and vibration isolating characteristics, the fan is stabilized axially to prevent deflection or wobble by the laterally extending sleeve portions 18.

Furthermore, the dual and opposed face to face clamping engagement between the heads and rubber elements on the one hand and the rubber elements and the driving plates on the other prevent relative displacement therebetween while permitting a yielding shearing action in a radial plane. Similarly by reason of the outwardly flared sleeves 18 being directly clamped about the surface of the hub 12 by the flanges 21 of the heads, the engaging annular surfaces thereof will transmit the driving torque without relative displacement while permitting of a yielding shearing action concentrically with the axis of rotation. Thus the driving torque is transmitted between the driving and driven members concentrically and radially with dual annular and radial shearing actions. In addition, the oppositely extending flanges 15 forming the bearing collar of the driving plates, the opposed outwardly extending sleeves 18 of the rubber elements, and the associated opposed and outwardly extending clamping flanges 21 of the heads provide such a base support for the fan assembly as to resist any cocking thereof and maintain proper alignment and rotational movement in the proper plane.

The invention claimed is:

1. In a fan assembly, a cylindrical driving member including a radially extending annular supporting plate having a cylindrical band secured about said member, a yielding torque transmitting element embracing said annular supporting plate and band in face to face driving engagement therewith, said element being flared outwardly to provide laterally extending sleeve portions in face to face driving engagement with said cylindrical member beyond the band of said plate, a pair of opposed cupped clamping heads surrounding and embracing said element in face to face driving engagement therewith, each of said heads having an outwardly extending flange portion in driving engagement with the respective sleeve portions of said element, a radially extending fan support, and means for securing said fan support to said clamping heads and drawing said heads into clamping engagement with said element to prevent displacement of the engaging surfaces therebetween and between said element, cylindrical member, and supporting plate for transmitting driving torque therebetween while permitting relative rotatory movement through the yielding shearing action of said element both concentrically and laterally of said driving member.

2. In a fan assembly, a cylindrical driving member, a pair of opposed radially extending annular supporting plates secured in face to face relation and each having oppositely extending annular flanges forming a relatively wide band secured about said member to provide a stabilizing support therefor, a yielding torque transmitting element mounted in face to face relation with each of said plates, each of said elements having a sleeve engaging said member beyond the respective flanges of said plates, a pair of opposed annular clamping heads surrounding said elements respectively in face to face clamping engagement therewith, said heads each being formed with an outwardly flaring flange for peripheral clamping engagement with the respective sleeves, a radially extending fan support, and means for securing said fan support and heads together with said torque transmitting elements clamped between said heads, supporting plates, and driving member.

KURT A. BEIER.

REFERENCES CITED

The following references are of record in the file of this patent:

UNITED STATES PATENTS

| Number | Name | Date |
|---|---|---|
| 2,041,507 | Zeder | May 19, 1936 |
| 2,041,555 | Lee | May 19, 1936 |
| 2,098,703 | Geyer | Nov. 9, 1937 |
| 2,126,708 | Schmidt | Aug. 16, 1938 |
| 2,207,376 | Gaublatz | July 9, 1940 |
| 2,214,512 | Thiry | Sept. 10, 1940 |
| 2,235,605 | Bugatti | Mar. 18, 1941 |
| 2,312,822 | Julien | Mar. 2, 1943 |
| 2,338,302 | Roche | Jan. 4, 1944 |
| 2,354,101 | Broders | July 18, 1944 |